United States Patent
Esliger et al.

(10) Patent No.: US 9,164,564 B2
(45) Date of Patent: *Oct. 20, 2015

(54) METHOD AND APPARATUS FOR OPTIMIZING POWER CONSUMPTION IN A MULTIPROCESSOR ENVIRONMENT

(75) Inventors: James Esliger, Richmond Hill (CA); Wilson Kwan, Toronto (CA)

(73) Assignee: ATI Technologies ULC, Markham, Ontario (CA)

( * ) Notice: Subject to any disclaimer, the term of this patent is extended or adjusted under 35 U.S.C. 154(b) by 0 days.

This patent is subject to a terminal disclaimer.

(21) Appl. No.: 12/711,397

(22) Filed: Feb. 24, 2010

(65) Prior Publication Data

US 2010/0153758 A1    Jun. 17, 2010

Related U.S. Application Data

(63) Continuation of application No. 11/469,182, filed on Aug. 31, 2006, now Pat. No. 7,694,160.

(51) Int. Cl.
G06F 1/32 (2006.01)

(52) U.S. Cl.
CPC ............. G06F 1/3203 (2013.01); G06F 1/329 (2013.01); Y02B 60/144 (2013.01)

(58) Field of Classification Search
CPC .......... G06F 1/26; G06F 1/32; G06F 1/3206; G06F 1/3212; G06F 1/329; G06F 1/3293; G06F 9/00; G06F 9/4843
USPC .......................................... 713/320; 718/100
See application file for complete search history.

(56) References Cited

U.S. PATENT DOCUMENTS

| | | | |
|---|---|---|---|
| 5,799,204 A * | 8/1998 | Pesto, Jr. | 710/10 |
| 5,913,068 A | 6/1999 | Matoba | |
| 6,215,275 B1 | 4/2001 | Bean | |
| 6,291,976 B1 | 9/2001 | Kaminski et al. | |
| 6,353,844 B1 * | 3/2002 | Bitar et al. | 718/102 |
| 6,501,999 B1 * | 12/2002 | Cai | 700/82 |
| 6,624,816 B1 | 9/2003 | Jones, Jr. | |
| 6,804,632 B2 | 10/2004 | Orenstien et al. | |
| 6,910,139 B2 | 6/2005 | Ishidera | |
| 7,251,737 B2 | 7/2007 | Weinberger et al. | |
| 7,356,819 B1 * | 4/2008 | Ricart et al. | 718/102 |
| 7,562,240 B2 | 7/2009 | Tsuji | |

(Continued)

OTHER PUBLICATIONS

Chiasserini, Carla-Fabiana et al.; Improving Battery Performance by Using Traffic Shaping Techniques; IEEE; vol. 19, No. 7; Jul. 2001; pp. 1385-1394.

(Continued)

*Primary Examiner* — Chun Cao
(74) *Attorney, Agent, or Firm* — Faegre Baker Daniels LLP

(57) ABSTRACT

A method and apparatus for reducing net power consumption in a computer system includes identifying a plurality of processing states operable to execute a task. A processing state and current drain pattern is selected that is most power efficient. A selected processing state may include one or more processing elements of the computer system such as one or more processors or accelerators and indicates the manner in which one or more portions of the received task may be distributed among the processing elements of the computer system. The current drain pattern selected may be a constant current drain pattern or a pulsed current drain pattern and may be selected to optimize power consumption when executing the task among the one or more processing elements.

15 Claims, 11 Drawing Sheets

(56) References Cited

U.S. PATENT DOCUMENTS

| | | | |
|---|---|---|---|
| 7,694,160 B2* | 4/2010 | Esliger et al. | 713/320 |
| 7,716,500 B2* | 5/2010 | Esliger | 713/300 |
| 2003/0042871 A1 | 3/2003 | Schlicht | |
| 2004/0215987 A1 | 10/2004 | Farkas et al. | |
| 2005/0125172 A1 | 6/2005 | Patino et al. | |
| 2005/0266301 A1 | 12/2005 | Smith et al. | |
| 2006/0051659 A1 | 3/2006 | Kelly et al. | |
| 2006/0053424 A1* | 3/2006 | Koistinen et al. | 718/105 |
| 2007/0256076 A1* | 11/2007 | Thompson et al. | 718/102 |
| 2008/0059814 A1 | 3/2008 | Esliger | |
| 2008/0059921 A1 | 3/2008 | Esliger et al. | |
| 2009/0099705 A1* | 4/2009 | Harris | 700/300 |

OTHER PUBLICATIONS

Park, Sung et al.; Battery Capacity Measurement and Analysis Using Lithium Coin Cell Battery; ISLPED '01; Aug. 2001.

Lorch, Jacob R.; A Complete Picture of the Energy Consumption of a Portable Computer; University of California at Berkeley; 1995; pp. 1-18.

Chiasserini, Carla-Fabiana et al.; Energy Efficient Battery Management; IEEE; vol. 19, No. 7; Jul. 2001; pp. 1235-1245.

Chiasserini, Carla F. et al.; A Model for Battery Pulsed Discharge with Recovery Effect; IEEE Conference, New Orleans, US; 1999.

Chiasserini, C.F. et al.; A Traffic Control Scheme to Optimize the Battery Pulsed Discharge; IEEE Conference, Atlantic City, US; 1999.

Flinn, Jason et al.; Energy-aware adaptation for mobile applications; Proceedings of the 17th ACM Symposium on Operating Systems Principles (SOSP); 1999; pp. 48-63.

Adamou, Maria et al.; A Framework for Optimal Battery Management for Wireless Nodes; IEEE Journal on Selected Areas in Communications; Aug. 14, 2001; pp. 1-30.

Adamou, Maria et al.; Computationally Simple Battery Management Techniques for Wireless Nodes; Proceedings of European Wireless; 2002; pp. 1-9.

Lorch, Jacob R. et al.; Software Strategies for Portable Computer Energy Management; IEEE Personal Communications; Jun. 1998; pp. 60-73.

Lorch, Jacob R. et al.; Using User Interface Event Information in Dynamic Voltage Scaling Algorithms; IEEE International Symposium on Modeling, Analysis, and Simulation of Computer and Telecommunications Systems (MASCOTS'03); 2003.

Lorch, Jacob R. et al.; Scheduling Techniques for Reducing Processor Energy Use in MacOS; Computer Science Division; EECS Department, UC Berkeley; 1997.

Anand, Manish et al.; Ghosts in the Machine: Interfaces for Better Power Management; International Conference on Mobile Systems, Applications and Services; 2004.

Zeng, Heng et al.; ECOSystem: Managing Energy as a First Class Operating System Resource; Technical Report CS-2001-01; Mar. 25, 2001; revised Aug. 8, 2001; pp. 1-14.

Weiser, Mark et al.; Scheduling for Reduced CPU Energy; Proceedings of the First Symposium on Operating Systems Design and Implementation; Usenix Association; Nov. 1994.

Chiasserini, C.F. et al., Pulsed Battery Discharge in Communication Devices; Int'l Conf. on Mobile Computing and Networking; ACM Press, New York, NY; 1999; pp. 88-95.

Othman, Mazliza et al.; Power Conservation Strategy for Mobile Computers Using Load Sharing; Mobile Computing and Communications Review; ACM Press, New York, NY; 1998; pp. 44-51.

Suh, Jinwoo et al.; Dynamic Power Management of Multiprocessor Systems; Proc. of the 16th Int'l Parallel and Distr. Processing Symp.; IEEE Computer Society, Washington, D.C.; 2002.

* cited by examiner

METHOD AND APPARATUS FOR OPTIMIZING POWER CONSUMPTION IN A MULTIPROCESSOR ENVIRONMENT

RELATED APPLICATIONS

This application is a continuation of co-pending U.S. application Ser. No. 11/469,182, filed Aug. 31, 2006, entitled "METHOD AND APPARATUS FOR OPTIMIZING POWER CONSUMPTION IN A MULTIPROCESSOR ENVIRONMENT", having as inventors James Esliger et al., owned by instant Assignee and is incorporated herein by reference, which is related to a copending U.S. application Ser. No. 11/469,208, filed Aug. 31, 2006, entitled "POWER SOURCE DEPENDENT PROGRAM EXECUTION", having as inventor James Esliger, owned by instant Assignee and is incorporated herein by reference.

FIELD OF THE INVENTION

The invention generally relates to optimizing power consumption and, more particularly, to optimizing power consumption in multiprocessor environments.

BACKGROUND OF THE INVENTION

Handheld devices are ubiquitous in the modern world due, in part, to their small size, mobility and functionality. Some of the functions performed by many handheld devices include supporting: digital still camera ("DSC") tasks, camcorder tasks, multimedia streaming reproduction tasks, video gaming tasks, etc. Consequently, handheld devices are known to incorporate several components including, but not limited to, a baseband processor/application processor (e.g., a CPU) and a multimedia accelerator comprising one or more processing elements (e.g., processors and/or accelerators). As one having ordinary skill in the art will recognize, at any given time, the CPU and/or one or more processing elements may be active when performing a desired function (e.g., displaying streaming video). In the related desktop or laptop computer environment, it is similarly known to partition various aspects of a particular task among a variety of functional blocks or processors. For instance, when performing basic MPEG-2 decoding, it is common to parse the received MPEG-2 stream while a graphics processing unit is contemporaneously performing motion compensation and inverse discrete cosine transfer (iDCT) subtasks.

The mobility of the handheld device is made possible through the use of one or more battery sources. Battery sources may be rechargeable or capable of only a single use. To maximize the time between each charge or between replacement of single use batteries (collectively, "time between charges"), handheld devices are built using power efficient components to reduce net power consumption.

One prior art solution that attempted to lengthen the time between each charge relied on the use of highly optimized processors designed to perform one or more specific tasks or portions of tasks. However, by incorporating highly optimized processors, designers limited the handheld device's ability to efficiently distribute a given task among multiple processors (e.g., load balancing). Other prior art solutions added power conservation mechanisms designed to put one or more components of the handheld device into a "low power mode" based on user input (e.g., when a user manually selects a low-power mode) or through an automatic feature (e.g., when the battery capacity falls below a certain threshold). These mechanisms typically shut down one or more components in the device, shut down one or more functional blocks of components in the device, lower the voltage supplying the device and its components (e.g., powering off one or more voltage islands), slow clock frequencies, or any combination thereof.

The above-mentioned solutions do not, however, fully consider the flexibility and ability of processing elements to process different types of tasks and portions thereof. Nor do the above-mentioned solutions consider power source or battery behavior to more selectively support tasks commonly performed on computer systems or handheld devices. Accordingly, a need exists for performing tasks on a computer system in a more efficient manner thereby reducing net power consumption. A further need exists to more efficiently execute tasks on a battery-powered computer system such that the operating time on a single battery charge is maximized.

BRIEF DESCRIPTION OF THE DRAWINGS

The invention will be more readily understood in view of the following description when accompanied by the below figures and wherein like reference numerals represent like elements.

DETAILED DESCRIPTION

Figure 1:
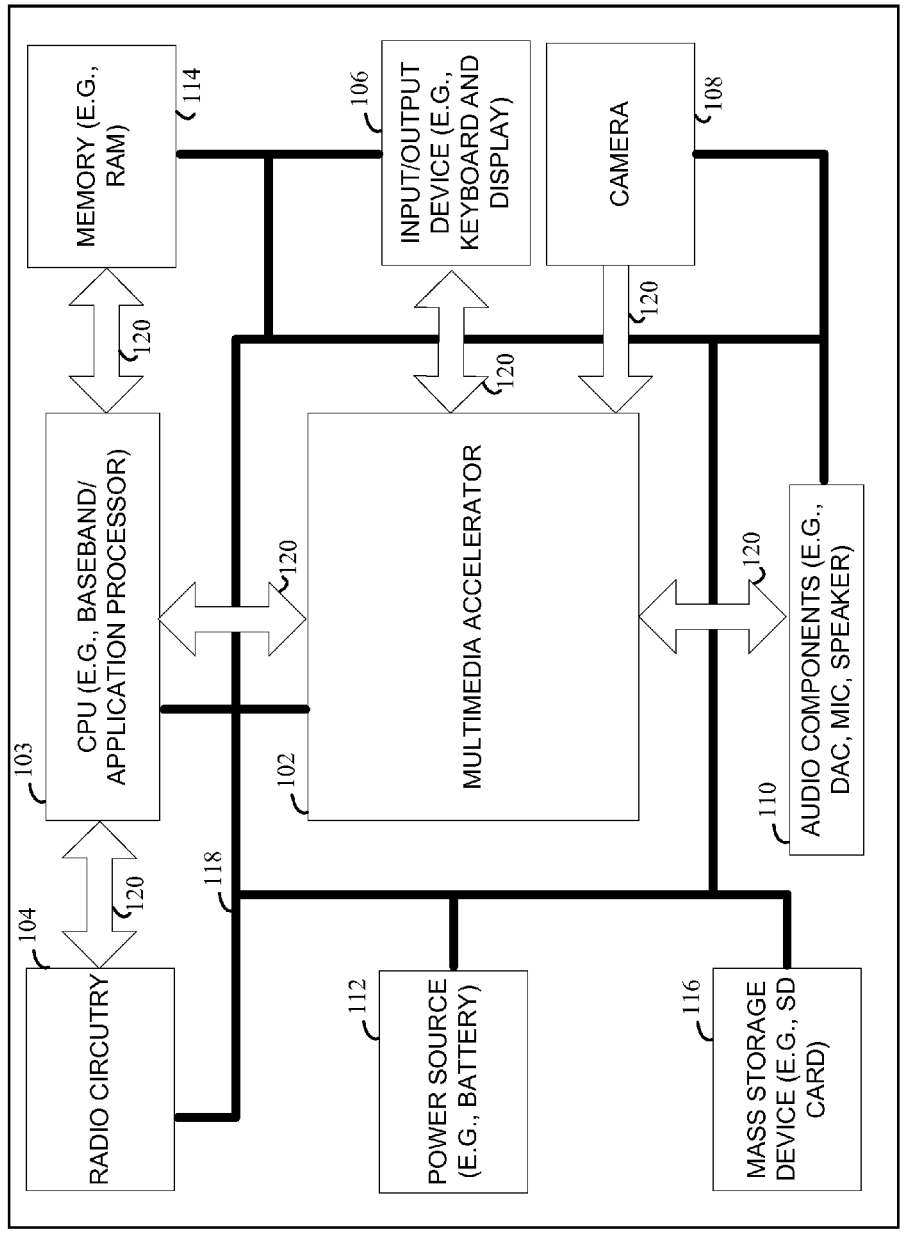
FIG. 1 is a block diagram illustrating one example of a prior art computer system including a multimedia accelerator coupled to, among other things, a radio, display, camera, speaker and power source in accordance with one embodiment of the present disclosure.

Generally, the present description provides a method and apparatus for reducing power consumption in a computer system by identifying a plurality of processing states operable to execute a task, wherein each of the processing states indicates how the task may be distributed among various processing elements of the computer system during execution. Subsequently, a processing state and a current drain pattern is selected that is most power efficient for the computer system such that the system may execute the task using the selected processing state and current drain pattern. The most power efficient processing state and current drain pattern reduces the net power consumption in the computer system thereby prolonging operational use of the computing device when the device uses a battery for a power source.

In another embodiment, a processing state is selected indicating how a received task may be distributed or balanced among at least one processing element of the computer system and further by selecting a current drain pattern to draw current from a power source. The current drain pattern may be based on at least one constant current drain parameter or at least one pulsed current drain parameter. In one embodiment, the method and apparatus first select a processing state and then, in response thereto, select a current drain pattern. In another embodiment, the method may contemporaneously select both a processing state and a current drain pattern at or about the same time. Lastly, the method and apparatus provide for the execution of the task using the selected processing state and the selected current drain pattern.

In one embodiment, each processing element corresponds to at least one processor and/or at least one accelerator. When more than one element makes up the processing element, each element may be capable of executing a portion of a received task; however, together the processing state is capable of executing the entire received task. In one embodiment, the processing state is selected based on the functional capabilities of each of the identified processing elements in the computer system. In another embodiment, the processing state is selected based on each processing element's available bandwidth and the processing bandwidth required by the received task or a portion thereof. In yet another embodiment, the processing state is selected based on the amount of shared memory available in the computer system, one or more coupling requirements of the received task and one or more design constraints of the computer system.

In one embodiment, the at least one constant current drain parameter may be any suitable indicator, flag, signal, register bit or bits or other information representing a battery characteristic or drain current characteristic associated with a constant current drain pattern (i.e., when the computer system is in a constant current drain mode). Similarly, the at least one pulsed current drain parameter may be any suitable indicator, flag, signal, register bit or bits or other information representing a battery characteristic or drain current characteristic associated with a pulsed current drain pattern (i.e., when the computer system is in a pulsed current drain mode).

In one embodiment, when it is determined that at least one current drain parameter is desirable, a corresponding current drain pattern (and/or a corresponding processing state) may be selected to optimize the current drain pattern and therefore maximize the operating time on a single battery and/or reduce net power consumed by the computer system.

The present disclosure can be more fully described with reference to FIGS. 1-11. In the following detailed description, numerous specific details are set forth in order to provide a thorough understanding of the present disclosure. It will be apparent to one of ordinary skill in the art, however, that these specific details need not be used to practice the present embodiments of the disclosure. In other instances, well-known structures, interfaces, and processes have not been shown or have not been shown in detail in order not to unnecessarily obscure the present disclosure.

FIG. 1 is a block diagram illustrating one example of a prior art computer system 100 including a multimedia accelerator 102 coupled to, among other things, a central processing unit ("CPU") 103, radio circuitry 104, input/output device 106, camera 108, audio components 110, power source 112, memory 114 and mass storage device 116 in accordance with one embodiment of the present disclosure. In one embodiment, computer system 100 is a handheld device. However, computer system 100 may be any device that computes such as, but not limited to, a desktop or other traditional computer system or one or more integrated circuits, one or more IC packages, etc. For purposes of example, each component is coupled to bus 108 thereby allowing communication therebetween. Bus 118 may be any suitable communication link connecting each component of computer system 100. Arrows 120 illustrate the general flow of information among the peripheral components, CPU 103 and multimedia accelerator 102.

In one embodiment, radio circuitry 104 may be any suitable component(s) such as a receiver inclusive of a tuner and demodulator capable of receiving and transmitting information between the computer system 100 and any number of external devices such as, but not limited to, other computer systems, handheld devices, servers, network providers, etc. As recognized, CPU 103 may be a baseband and application processor operative to, among other things, interpret instructions, process data, control computer system 100 components by passing information among components of computer system 100. One having ordinary skill in the art will recognize that CPU 103 may be implemented, for example, as any suitable device or devices such as one or more programmable or non-programmable (e.g., dedicated): processors, processing engines, microprocessors, microcontrollers, digital signal processors, application specific integrated circuits, state machines, programmable logic arrays, or any suitable combination thereof.

In one embodiment, memory 114 is any suitable volatile or non-volatile memory device, (also referred to as computer readable medium) or memory devices such as, but not limited to, one or more: registers, system memory, frame buffer memory, flash memory, cache etc. In one embodiment, memory 114 is a random access memory. Mass storage device 116 is any suitable device capable of storing information in a persisting and machine-readable fashion such as, but not limited to, one or more: hard disks, floppy disks, flash memory, optical discs, magneto-optical discs, drum memory, magnetic tape, etc. In one embodiment, mass storage device 116 is a Secure Digital ("SD") card.

In one embodiment, input/output device 106 includes one or more suitable input devices, output devices or input/output devices such as, but not limited to, a keyboard, touchpad, LCD display, etc. Camera 108 may be any suitable number of devices for capturing images using any suitable aperture. In one embodiment camera 108 may be a DSC or any other digital camera suitable for creating individual images or video. Audio components 110 may be any suitable number of devices such as a microphone and speaker for receiving or reproducing audio signals.

Multimedia accelerator 102 may be any suitable graphics processing unit or one or more programmable or non-programmable (e.g., dedicated) multimedia processors or multimedia accelerators, including but not limited to, one or more: processors, processing engines, microprocessors, microcontrollers, hardware accelerators, digital signal processors, application specific circuits, state machines, programmable logic arrays, or any suitable combination thereof. While multimedia accelerator 102 is discussed in more detail with respect to FIG. 2, it is recognized, that multimedia accelerator 102 may support any number of features such as, but not limited to: peripheral interfacing, audio processing, graphics processing, video processing, audio/video processing, imaging, etc.

In one embodiment, peripheral interfacing includes, for example, interfacing with: camera 108 for control and data transmission, input/output device 106 for control of one or more displays and reception of user input, TVOut, I²C peripherals, mass storage device, etc. Audio processing, for example, may include: WAV/MP3/AAC/AMR/PCM playback and recording and processing of data from a Musical Instrument Digital Interface ("MIDI"). Graphics processing, for example, may include: 2D and 3D processing and accelerating. Video processing, for example, may include: H.264 and MPEG-4 playback and recording. Audio/Video processing, for example, may include: movie playback from mass storage device 116 or radio 104 (e.g., from a server), video ringtone playback, and video/audio recording. Imaging processing, for example, may include: DSC capture and image preview, digital effects, image decode, and thumbnail generation.

Power source 112 may comprise any suitable device or interface capable of providing suitable power to computer system 100. In one embodiment, power source 112 is a battery that stores chemical energy and makes it available in electrical form. As known to those of ordinary skill in the art, batteries generally consist of electrochemical cells such as one or more rechargeable or single use galvanic cells, fuel cells or flow cells. The battery may contain a power conditioning circuit that controls battery 112 including one or more voltage regulators and other components coupling the battery to the components of computer system 100. Power source 112 may alternatively be any other suitable power source such as, but not limited to, fuel cells, solar panels, one or more capacitors, etc.

The inventors have recognized that batteries may provide a longer operating time if the current drain pattern is optimized to take advantage of the electrochemical characteristics of the battery. Because batteries have a theoretical maximum amount of energy available per charge (generally based purely on the mass of the electrodes and the volume of the electrolyte in the cells), the present disclosure attempts to maximize the time between charges by designing a computer system and battery capable of drawing an amount of energy from the battery as close as possible to this theoretical maximum value. As one having ordinary skill in the art will recognize, the delivered (or drawn upon) energy from a battery depends on, among other things, the intensity of the discharge current, the power level drained from the battery, and whether the discharge is constant or pulsed.

As energy is provided by batteries, the material in the electrochemical cells at the electrode-electrolyte interface are consumed by electrochemical reactions and are replaced by new material that move through diffusion. However, at high constant current drain usage (e.g., above what is commonly referred to as the limiting current), diffusion is unable to compensate for the depletion of active materials and the electrochemical cell voltage will drop below a threshold level commonly referred to as the cutoff value. This may occur even if there remains an adequate volume of electrolyte in the cell to provide energy for the drawing device (e.g., computer system 100). At this point, the battery is considered discharged and must either be recharged or replaced.

Some of the limitations presented above with respect to the constant current drain usage ("constant current drain pattern") may be alleviated if the battery is operated using a pulsed current drain pattern. As one having ordinary skill in the art will recognize, when a battery is pulsed, current is primarily delivered during pulses. In between each pulse is a relaxation period where the diffusion process may take place and attempt to restore the battery to a state where it will not be considered discharged. This relaxation period may be particularly valuable when current drained increases due to heavier loads. This may, depending on the load and battery used, remain true even if the pulsed current drain pattern includes a background current (e.g., where there is a non-zero current drain during the relaxation period).

Although one current drain pattern may be efficient under one set of operating circumstances, a second current drain pattern may be better suited for another set of operating circumstances. One having ordinary skill in the art will recognized that operating circumstances include, but are not limited to, the load coupled to the battery, the type of battery employed, and the state of the battery.

Figure 2:
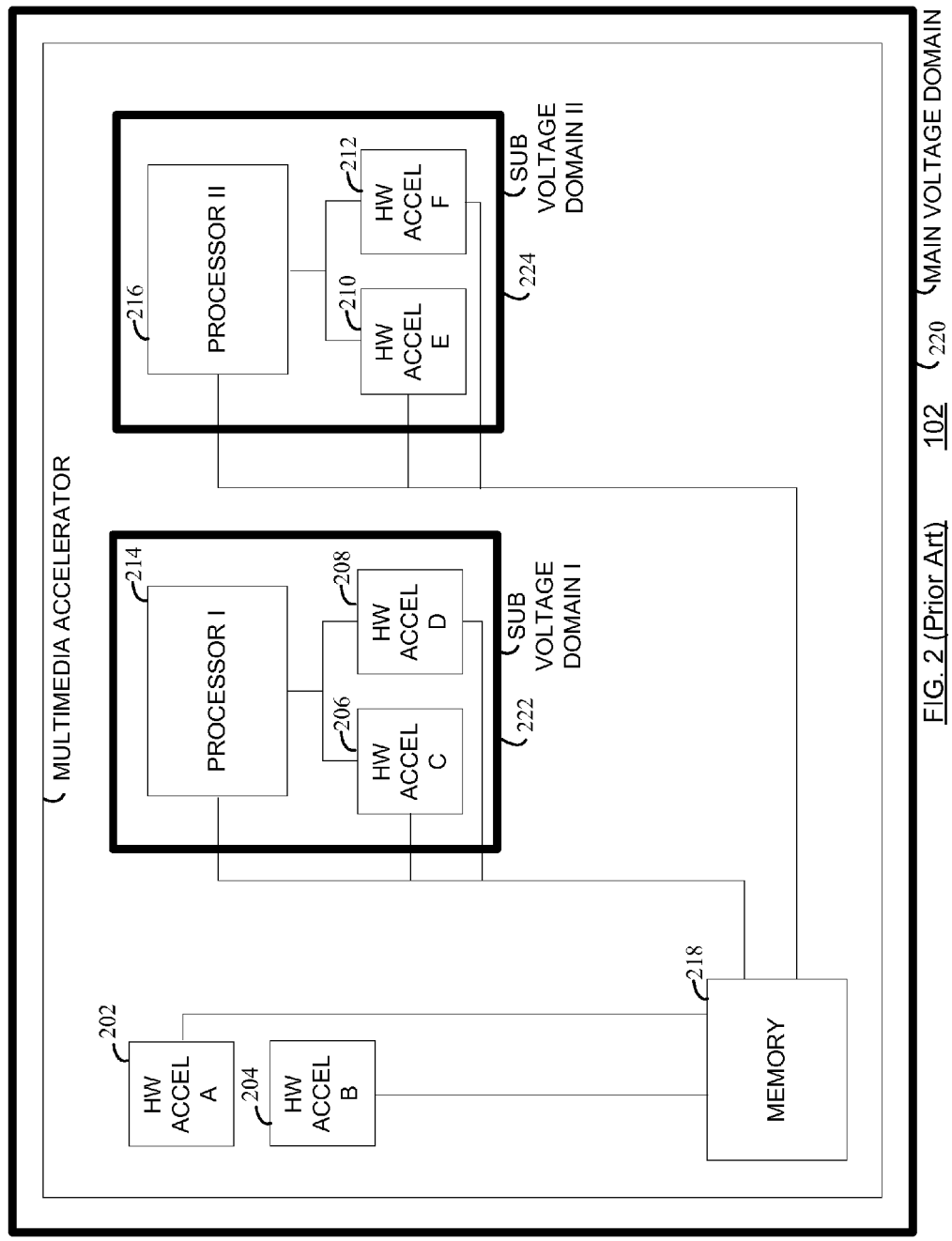
FIG. 2 is a block diagram illustrating one example of a prior art multimedia accelerator having at least one processor and one hardware accelerator.

FIG. 2 is a block diagram illustrating one example of a prior art multimedia accelerator comprising at least one processing element. As used herein, the term processing element refers to any component of the multimedia accelerator 102 and may in one embodiment include one or more processors, hardware accelerators or any combination thereof. As illustrated multimedia accelerator 102 includes six hardware accelerators (A-F) 202-212 two processors (I-II) 214-216, memory 218, a main voltage island 220, and two sub voltage islands (1-2) 222-224.

Hardware accelerators (e.g., hardware accelerators A-F 202-212) are highly specialized blocks of hardware designed for very specific purposes. Typical examples of this include, but are not limited to, display drivers, graphic accelerators, video decode/encode accelerators and sensor/camera interface circuits. As illustrated, some hardware accelerators (e.g., hardware accelerators C-F 206-212) may be affiliated with certain processors (e.g., processors I-II 214-216) while other hardware accelerators (e.g., hardware accelerators A-B 202-204) may be independent processing elements.

Processors (e.g., processors I-II 214-216) are generally less specialized hardware blocks and may be programmed to run a variety of functions. For instance, processors I-II 214-216 may run C code that implements operating system services, audio and video codecs, image enhancement algorithms, filesystem algorithms, and possibly power management algorithms. Further, processors may also track and maintain a value representative of the number of instructions it is executing at any given time.

Memory 218 may be any suitable memory located on the same die as or on another die coupled to multimedia accelerator 102. Memory 218 may be implemented similar to the manner described above with respect to memory 114. In one embodiment memory 218 is a random access memory. Generally, memory 218 is used for code and data for processors (e.g., processors I-II 214-216), intermediate content buffers, scratch data for algorithms, and visible/audio data to be delivered to external peripherals like an audio DAC (e.g., associated with audio components 110) or a display device (e.g., input/output device 106).

Main voltage domain 220 and sub voltage domains I-II 222-224 may also be present in multimedia accelerator 220. One having ordinary skill in the art will recognize that the terms voltage island and sub voltage island are synonymous with the terms voltage domain and sub voltage domain, respectively. As used herein, voltage domains and sub voltage domains are areas in a given integrated circuit where all component parts of that domain "run" at the same voltage (e.g., the voltage level of the domain). It is recognized that multiple voltage domains and sub voltage domains may be present within the same IC, and each may be powered at a different voltage level or completely powered down when not needed.

As illustrated in FIG. 2, memory 218 is coupled to each component within multimedia accelerator 103. Hardware accelerators A-B 202-204 are affiliated with main voltage domain 220. Processor 1214 and hardware accelerators C-D 206-208 are affiliated with sub voltage domain 1222. As illustrated Processor 1214, but not processor II 216, is capable of accessing hardware accelerators C-D 206-208. Processor II 216 and hardware accelerators E-F 210-212 are affiliated with sub voltage domain II 224. As illustrated Processor II 216, but not processor 1214, is capable of accessing hardware accelerators E-F 210-212.

Figure 3:
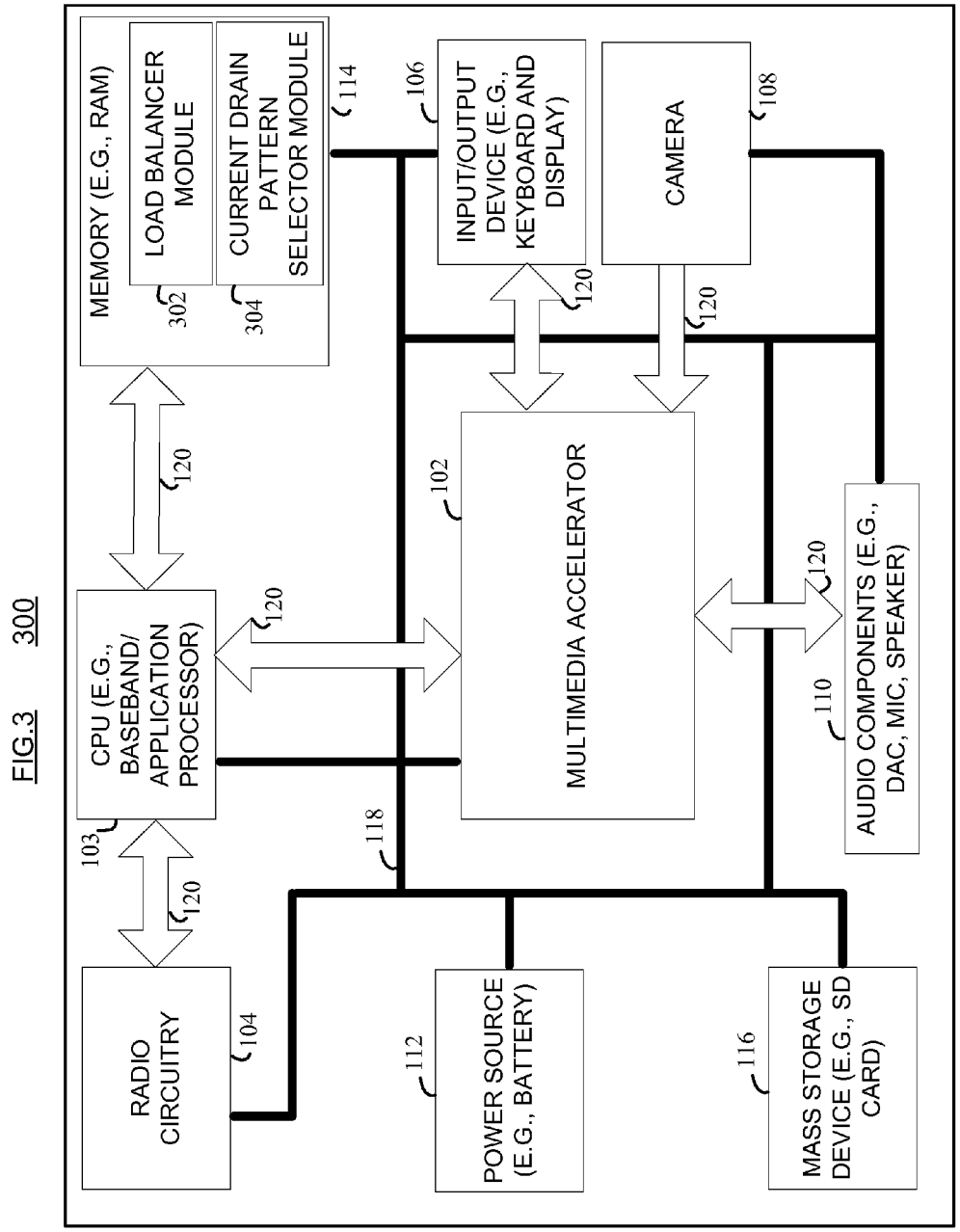
FIG. 3 is a block diagram illustrating one example of a computer system including the components illustrated in FIG. 1 in addition to memory having a load balance module and current drain pattern module stored therein in accordance with one embodiment of the present disclosure.

FIG. 3 is a block diagram illustrating one example of a computer system including the components illustrated in FIG. 1 in addition to memory having a load balance module 302 and current drain pattern selector module 304 stored therein in accordance with one embodiment of the present disclosure. Each of load balancer module 302 and current drain pattern selector module 304 corresponds to any suitable set or sets of executable instructions stored in memory 114 capable of being executed by CPU 103 or any other suitable processor (e.g., a processor associated with multimedia accelerator 102). When executed by CPU 103 or the any other suitable processor, the load balancer module 302 and current drain pattern selector module 304 cause the CPU 103 or the any other suitable processor to perform the methods of FIGS. 5-10. Hereinafter, when the term load balancer module 302 or current drain selector module 304 is used, it is implied that the modules 302, 304 are executed on a suitable processor (e.g., CPU 103).

Figure 4:
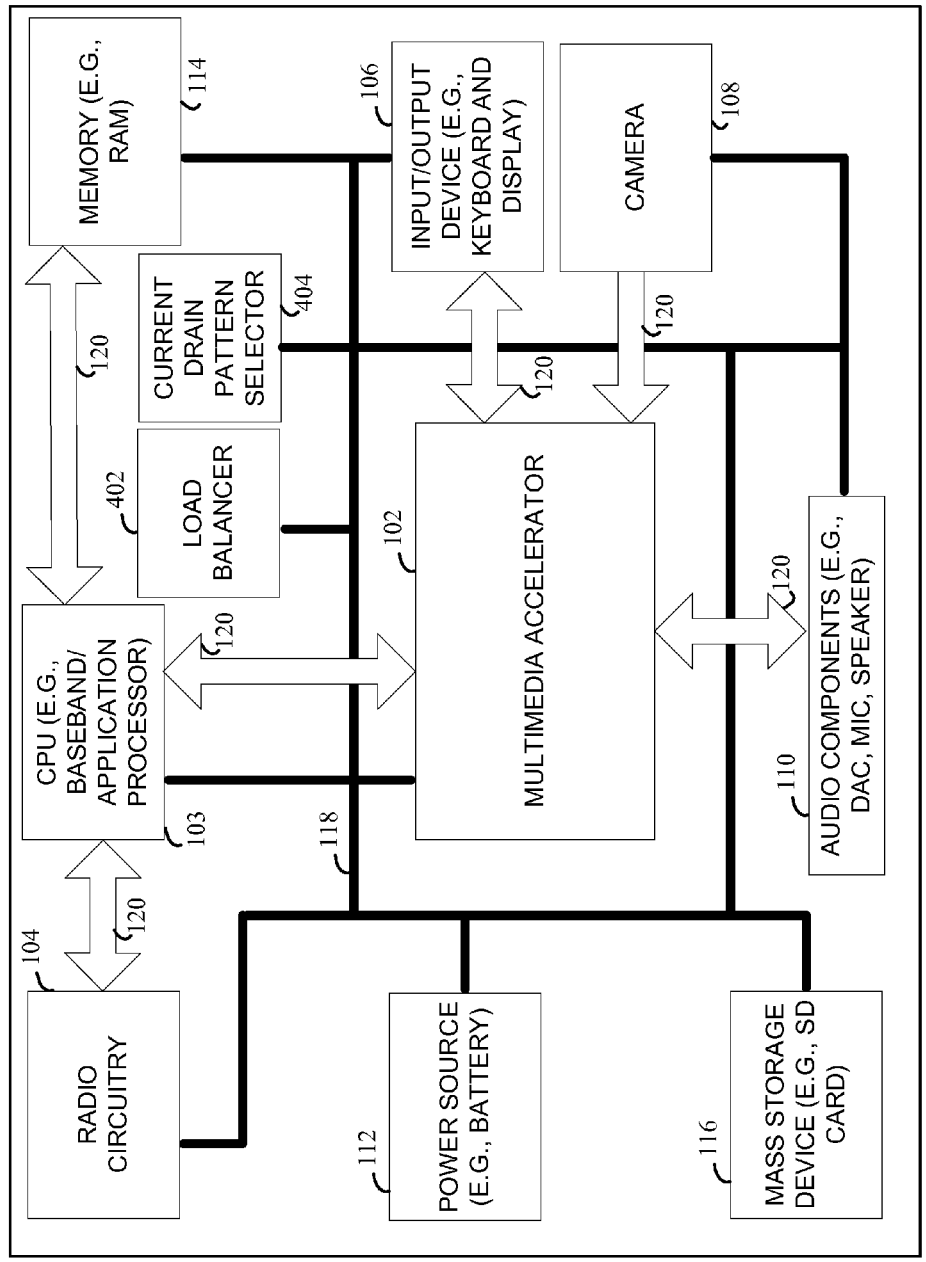
FIG. 4 is a block diagram illustrating one example of a computer system including those components illustrated in FIG. 1 in addition to a load balancer and a current drain pattern selector in accordance with one embodiment of the present disclosure.

FIG. 4 is a block diagram illustrating one example of a computer system including those components illustrated in FIG. 1 in addition to a load balancer 402 and a current drain pattern selector 404 in accordance with one embodiment of the present disclosure. Load balancer 402 and current drain pattern selector 404 correspond to any suitable device or devices capable of performing the methods described below with respect to FIGS. 5-10. In one embodiment, load balancer 402 and current drain pattern selector 404 each correspond to one or more programmable or non-programmable (e.g., dedicated): processors, processing engines, microprocessors, microcontrollers, digital signal processors, application specific integrated circuits, state machines, programmable logic arrays, or any suitable combination thereof. As illustrated, the load balancer 402 and the current drain pattern selector 404 are electrically connected with each component of computer system 400 via bus 118.

Figure 5:
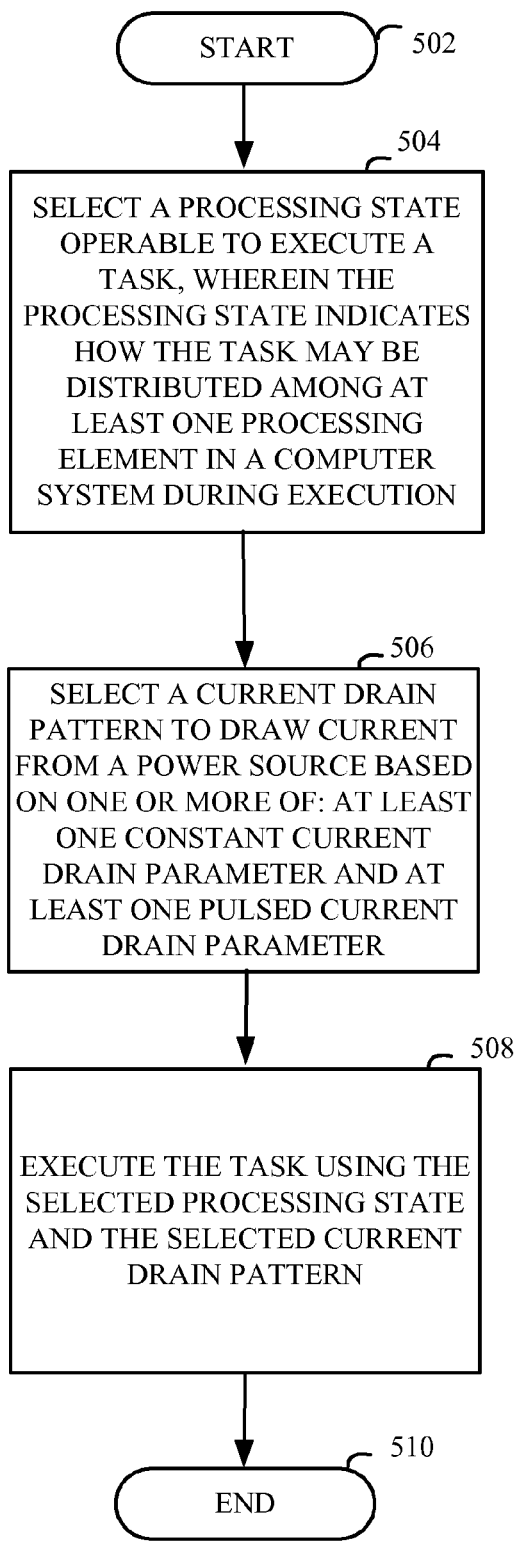
FIG. 5 is a flow chart illustrating one example of a method for reducing power consumption in a computer system, for example the computer system of FIG. 3 or FIG. 4, when executing a task in accordance with one embodiment of the present disclosure.

FIG. 5 is a flow chart illustrating one example of a method for reducing power consumption in a computer system, for example the computer systems of FIGS. 3 and 4, when executing a task in accordance with one embodiment of the present disclosure. The method of FIG. 5 begins in block 502 where, for example, a request to execute a task is received by computer system 300, 400. In one embodiment, the request may be received using input/output device 106 and may correspond to, for example, a radio task, a camera task, a display task, a decode task, an encode task, etc. In one embodiment, the received request might be identified by CPU 103 or any suitable device (e.g., load balancer module 302, load balancer 402) to determine what the request requires or pertains to. Also in block 502, the method may parse the task into one or more portions. For example, if the task corresponds to encoding a movie (i.e., using camera 108 as a camcorder), a camera such as camera 108 may be used to capture a stream of video samples and supply the captured video stream to the multimedia accelerator 102. Concurrently, a microphone and ADC is used to capture a stream of audio samples and supply the captured audio stream to the multimedia accelerator 102. In this embodiment, the task may be parsed into the following portions: (1) a video algorithm to compress the captured video into a video format such as H.264; (2) an audio algorithm to compress the captured audio into an audio format such as AAC; (3) a system layer algorithm to merge both compressed streams into a standard file format such as 3GP so that it may be viewed later on a suitable display (e.g., input/output device 106); and (4) a filesystem layer algorithm to write the captured merged streams (e.g., 3GP file) to a mass storage device (e.g., mass storage device 116). In one embodiment, the parsing function may be performed by load balancer module 302 or load balancer 402 of FIGS. 3 and 4, respectively. In another embodiment, the parsing function may be performed by CPU 103.

The method continues in block 504 where a processing state operable to execute the task is selected and wherein the processing state indicates how the task may be distributed among the at least one processing element in a computer system during execution. In an exemplary embodiment, block 504 may be performed by, for example, load balancer module 302 or load balancer 402 of FIGS. 3 and 4, respectively. The exact nature of how to split the work across one or more processing elements will vary according to a variety of factors. Two examples are provided below with respect to FIGS. 6 and 8.

Thereafter, the method continues in block 506 where a current drain pattern (e.g. a constant current drain pattern or a pulsed current drain pattern) to draw current from a power source (e.g., a battery) is selected based on one or more of: at least one constant current drain parameter and at least one pulsed current drain parameter. The at least one constant current drain parameter may be any suitable indicator, flag, signal, register bit or bits or other information representing a battery characteristic or drain current characteristic associated with a constant current drain pattern (i.e., when the computer system is in a constant current drain mode). Similarly, the at least one pulsed current drain parameter may be any suitable indicator, flag, signal, register bit or bits or other information representing a battery characteristic or drain current characteristic associated with a pulsed current drain pattern (i.e., when the computer system is in a pulsed current drain mode). The at least one constant current drain parameter and the at least one pulsed current drain parameter may correspond to pre-determined information maintained by computer system 300, 400 in, for example, memory 114 or may be measured by computer system 300, 400 in real time by any suitable device (not specifically illustrated) capable of detecting and/or determining suitable drain current characteristics or battery characteristics. In one embodiment, the suitable device may correspond to the battery conditioning circuit associated with power source 112, and at least one of the current drain pattern selector module 304 and current drain pattern selector 404. Examples of possible constant current drain parameters and pulsed current drain parameters are provided below in further detail with respect to FIG. 9. In one embodiment, the method of block 506 may be implemented using, for example, current drain pattern selector module 304 or current drain pattern selector 404 of FIGS. 300, 400.

The method then proceeds in block 508 wherein the task is executed using the selected processing state and the selected current drain pattern. Generally, this may be implemented using multimedia accelerator 102, power source 112 and one of: (i) load balancer module 302 and current drain pattern selector module 304 and (ii) load balancer 402 and current drain pattern selector 404. In other words, the multimedia accelerator 102 will be responsible for executing the task (and any portions thereof) according to the manner selected in block 504 and the power source 112 will be responsible for supplying current according to the selected current drain pattern from block 506. One having ordinary skill in the art will also recognize that CPU 103 and other peripheral components may also be used when implementing block 508 such that data and other information is, among other things, properly captured and transferred among computer system components.

The method ends in block 510 wherein, for example, a particular task is executed by computer system (e.g., computer system 300, 400). In one embodiment, by distributing the task among the selected processing elements and by selecting an appropriate current drain pattern, battery efficiency may be optimized. In one embodiment, during executing, at least one portion of the multimedia accelerator 102 is provided an overall slower clock compared to a prior art solution that employs only a single processing element. In another embodiment, during executing, at least one portion of the multimedia accelerator 102 is provided a reduced voltage (e.g., on one of main voltage domain 220, sub voltage domain 1 222 and sub voltage domain II 224) relative to a prior art solution employing a single processing element.

Figure 11:
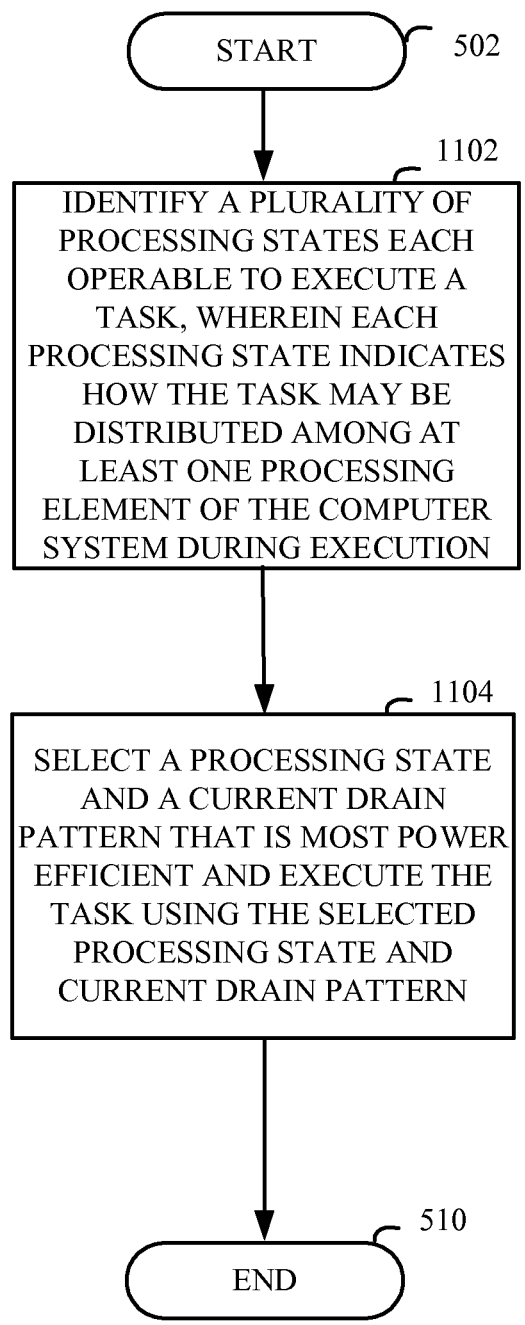
FIG. 11 is a flow chart illustrating another example of a method for reducing power consumption in a computer system, for example the computer system of FIG. 3 or FIG. 4, when executing a task in accordance with one embodiment of the present disclosure.

FIG. 11 provides a flow chart illustrating another example of a method for reducing power consumption in a computer system, for example the computer system of FIG. 3 or FIG. 4, when executing a task in accordance with one embodiment of the present disclosure. The method begins with block 502 and continues with block 1102 where a plurality of processing states each operable to execute a task are identified, wherein each processing state indicates how the task may be distributed among at least one processing element of the computer system during execution. Block 1102 may be implemented using, for example, load balancer 402 or load balancer module 302. Subsequently, a processing state and a current drain pattern that is most power efficient is selected for execution of the task using the selected processing state and current drain pattern as illustrated in block 1104. As explained below, the most efficient processing state and current drain pattern may correspond to the state and pattern that reduces net power consumption from a power source during execution of a task or over several tasks. In one embodiment, this corresponds to maximizing the operating time on a single battery charge. As recognized by those having skill in the art, while a pulsed current drain pattern might require a greater amount of power from the power source than a constant current drain pattern over a common period of time, the pulsed current drain pattern may nevertheless be more power efficient and reduce the net power consumption in the computer system. As previously discussed the processing state and current drain pattern may be selected using load balancer 402 (or load balancer module 302) and current drain pattern selector 404 (or current drain pattern selector 304). The method then concludes with block 510.

FIGS. 6-10 provide various examples of methods that, among other things, identify a plurality of processing state of the computer system that are operable to execute a task. The processing states indicate how the task may be distributed among at least one processing element of the computer system during execution. After identification, the computer system selects a processing state and a current drain pattern that is most power efficient (e.g., that reduces net power consumption) and executes the task using the selected processing state and current drain pattern. The selection of the most power efficient processing state and current drain pattern may be performed in several different ways as provided below. Accordingly, the methods of FIGS. 6-10 provide examples of how the methods of FIGS. 5 and 11 may be performed.

Figure 6:
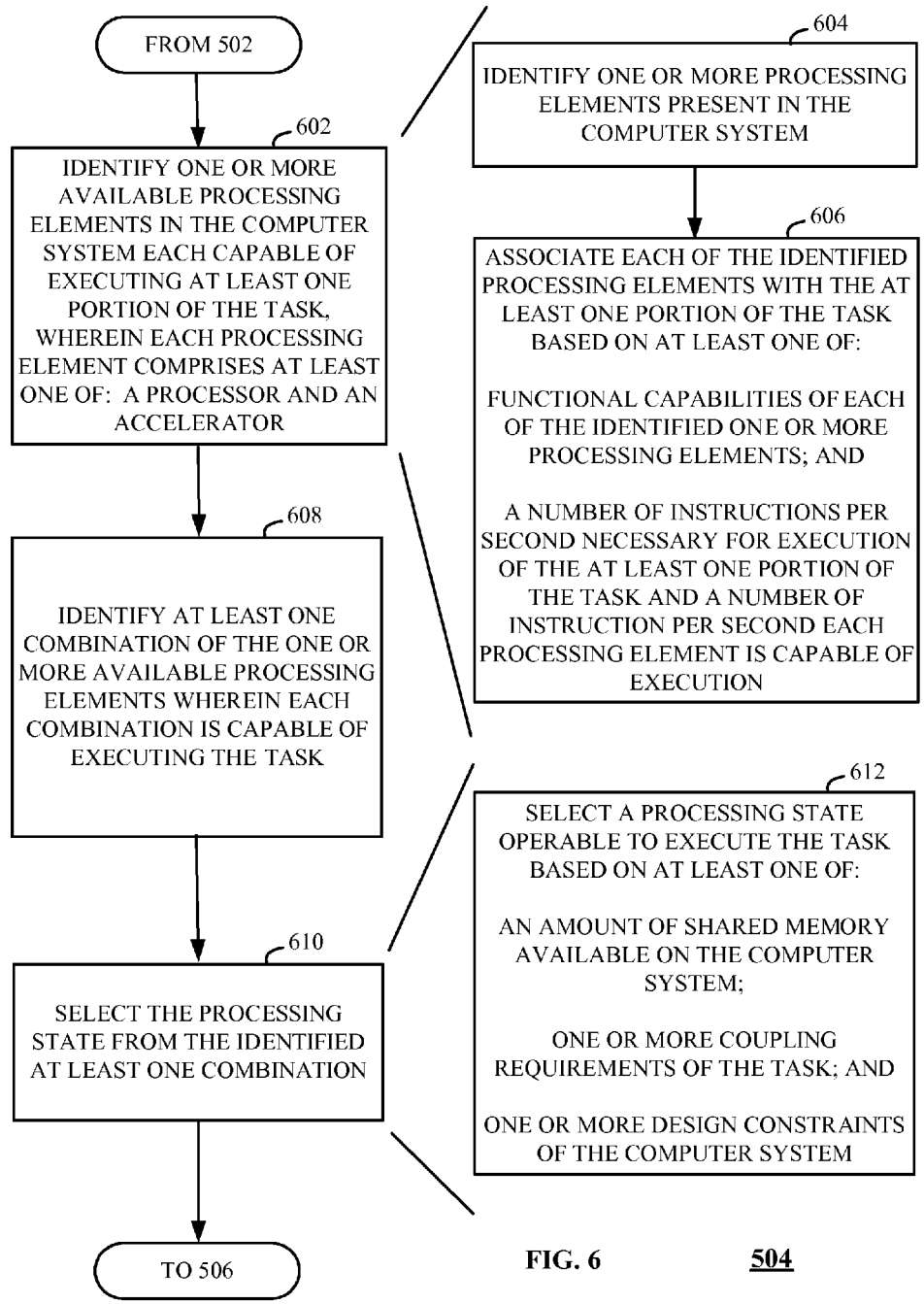
FIG. 6 is a flow chart illustrating one example of a method for selecting a processing state operable to execute a task in accordance with one embodiment of FIG. 5.

FIG. 6 is a flow chart illustrating one example of a method for selecting a processing state operable to execute a task in accordance with one embodiment of FIG. 5. Because FIG. 6 is illustrative of block 504 of FIG. 5, the methods disclosed herein with respect to FIG. 6 may be implemented using load balancer module 302 or load balancer 402. The method begins from block 502 of FIG. 5 and continues with block 602 where one or more available processing elements in the computer system each capable of executing at least one portion of the task is identified, wherein each processing element comprises at least one of: a processor and an accelerator. In one embodiment, block 602 includes blocks 604-606. For instance, in block 604, one or more processing elements in the computer system is identified. In one embodiment, this may include using a look up table to identify one or more processors or accelerators associated with computer system 300, 400.

Next, the method continues in block 606 where each portion of the task is associated with at least one of the identified processing elements based on at least one of: functional capabilities of each of the identified one or more processing elements; and a number of instructions per second necessary for execution of the at least one portion of the task ("processing bandwidth required") and a number of instructions per second each processing element is capable of executing ("processing bandwidth available"). The functional capabilities of each of the identified one or more processing elements may correspond to each processing element's ability to execute a particular task or portion thereof. For instance, using FIG. 2 as an example, it may be determined that both processor 1 214 and processor II 216 are present in the computer system 300, 400. However, it may further be determined that processor 1 214 is only capable of decoding MPEG-4 while processor II 216 is capable of, among other things, encoding captured video from camera 108. Thus, if the requested task from block 502 requires encoding, only processor II 216 will be associated with the appropriate task or portion thereof. In another embodiment, it may be that both processors I-II 214, 216 are theoretically able to process a particular task or portion thereof, but that processor 1 214 is busy processing other data. Thus, processor II 216 would be the processing element having the functional capability.

The processing bandwidth required and processing bandwidth available may correspond to any suitable indicator representing whether each identified processing element has enough power or "bandwidth" to efficiently and expeditiously execute the task. One of ordinary skill in the art will appreciate that each processor's functional capabilities and processing bandwidth available may be predetermined and stored by computer system (e.g., in a look-up table associated with memory 114) or measured in real time using any suitable method such as, but not limited to, using a timer to measure the idle or executing time of the processor while considering the known clock rate, as known in the art. Similarly, the processing bandwidth required may be stored by the computer system (e.g., using memory 114) based on the type of request identified or measured in real time, for example, by measuring the depth (e.g., content) of the input and/or output buffers (not illustrated) to determine if a task is being processed at a proper rate, as known in the art.

Thereafter, the method proceeds in block 608 where at least one combination of the one or more available processing elements is identified, wherein each combination is capable of executing the task. Each combination of elements must, as a whole, be capable of executing the entire task and not just a portion thereof.

Once at least one combination is identified, the processing state may be selected from the identified at least one combination as provided in block 610. The method of block 610 may be performed according to block 612 where the processing state is selected based on at least one of: an amount of shared memory available on the computer system, one or more coupling requirements of the task; and one or more design constraints of the computer system. The amount of shared memory available may indicate, for example, if the processing elements are able to store information necessary for communication with other processing elements executing one or more portions of the same task or with other processing elements executing related tasks. The one or more coupling requirements of the task may indicate, for example, which processing elements are associated with the same voltage domain or sub domain so that a determination can be made as to whether it is efficient or necessary to power up a previously powered down domain to use a particular processing element. Alternatively, the one or more coupling requirements of the task may indicate, for example, which processing elements are capable of accessing shared resources (e.g., a shared codec) necessary for proper execution of a particular task or portion thereof. The one or more design constraints of the computer system may indicate, for example, whether there are any external restraints associated with the components for the computer system that may prevent a component from being used in a particular manner (e.g., an OEM might not permit designers to use a processing element for task A preferring instead to preserve bandwidth for task B). Similar to blocks 604 and 606, these values, requirements and constraints may be predetermined based on the received request and stored in any suitable fashion (e.g., in memory 114) and appropriately retrieved or evaluated in real time using any suitable device or technique such as, for example, a memory manager as known in the art. The method concludes in block 506.

Figure 7:
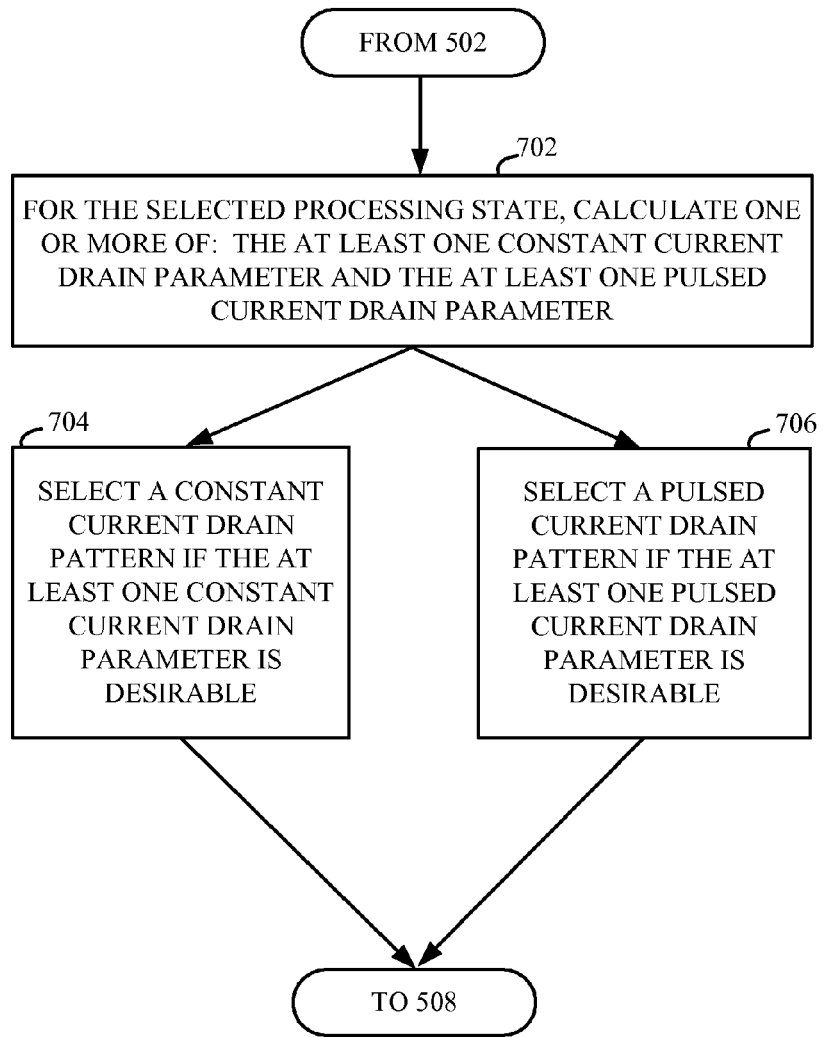
FIG. 7 is a flow chart illustrating one example of a method for selecting a current drain pattern to draw energy from a power source in accordance with one embodiment of FIG. 5.

FIG. 7 is a flow chart illustrating one example of a method for selecting a current drain pattern to draw energy from a power source in accordance with one embodiment of FIG. 5. The method begins after completion of block 502, wherein, for the selected processing state, one or more of: the at least one constant current drain parameter and the at least one pulsed current drain parameter is calculated in block 702. Examples of and how to calculate the at least one constant current drain parameter and the at least one pulsed current drain parameter is explained below with respect to FIG. 9. Next, the method continues with block 706 where a constant current drain pattern is selected if the at least one constant current drain parameter is desirable. Alternatively, in block 708, a pulsed current drain pattern is selected if the at least one pulsed current drain parameter is desirable. Thereafter, the method continues to, for example block 508. Examples of how to determine whether a parameter is desirable is explained below with respect to FIG. 10. In one embodiment, current drain selector module 304 or current drain pattern selector 404 may be employed to perform the method of FIG. 7. The method concludes with block 508.

Figure 8:
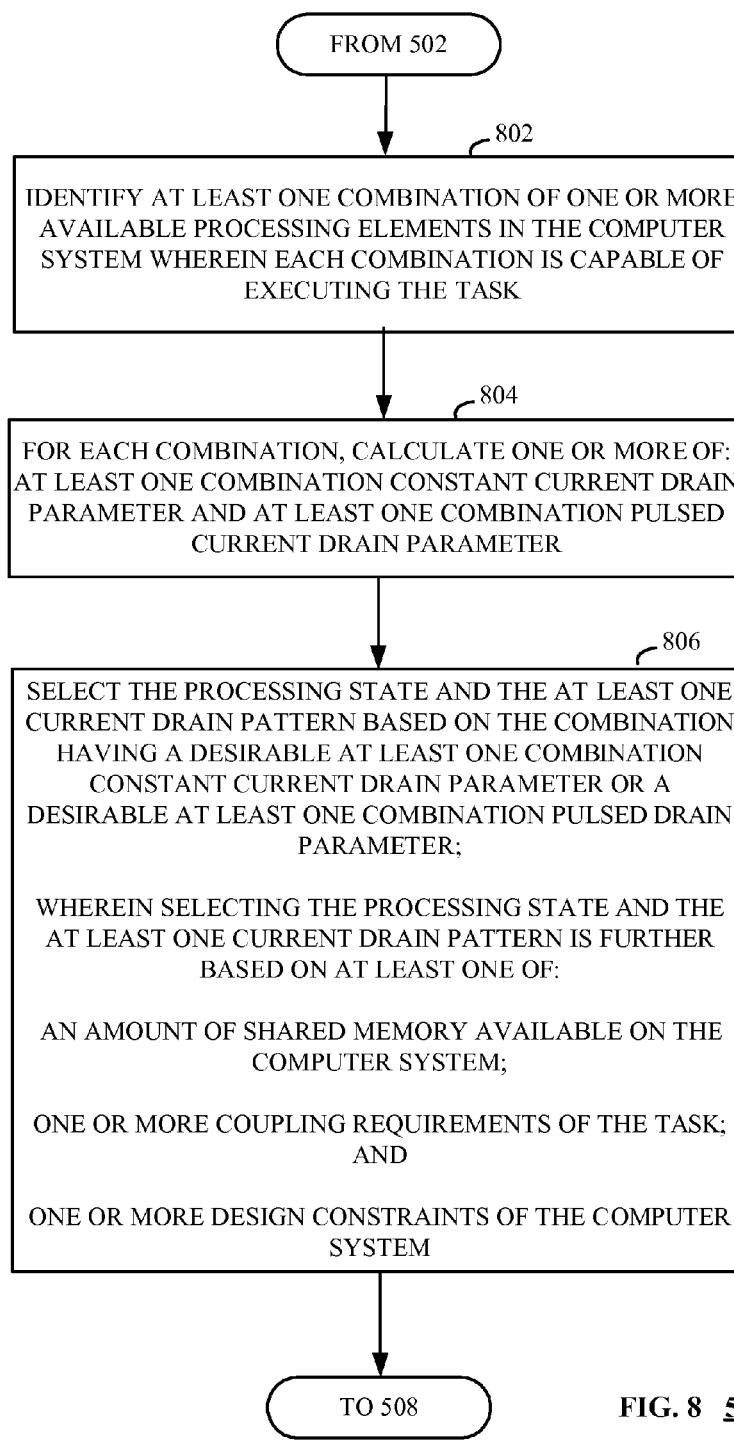
FIG. 8 is a flow chart illustrating one example of a method for selecting at least one processing state and a current drain pattern to draw energy from a power source in accordance with one embodiment of FIG. 5.

FIG. 8 is a flow chart illustrating one example of a method for selecting at least one processing state and a current drain pattern to draw energy from a power source in accordance with one embodiment of FIG. 5. While FIGS. 6-7 broke down the method of FIG. 5 keeping the methods of blocks 504 and 506 separate, FIG. 8 illustrates how, in another embodiment, blocks 504 and 506 may be performed concurrently. The method begins after completion of block 502 and continues with block 802 wherein at least one combination of one or more available processing elements in the computer system is identified wherein each combination is capable of executing the task. Block 802 is similar to block 602 and blocks 604-606 and may be implemented using load balancer module 302 or load balancer 402.

The method continues in block 804 wherein, for each combination, one or more of: at least one combination constant current drain parameter and at least one combination pulsed current drain parameter is calculated. Method block 804 is similar to block 704 but is performed for each identified combination as, in this alternative embodiment, the processing state has not yet been selected. Accordingly, method block 804 may be implemented using current drain pattern selector module 304 or current drain pattern selector 404.

Thereafter, the method proceeds in block 806 wherein the processing state and the current drain pattern is selected based on the combination having (i.e., associated with) a desirable at least one combination constant current drain parameter or a desirable at least one combination pulsed drain parameter. In one embodiment, block 806 includes evaluating each of the calculated drain parameters and determining which parameter is desirable based on any suitable comparison or standard designed to more efficiently drain power from the power source 112 (e.g., battery). After one parameter is determined to be desirable, the processing state to which the parameter is associated is selected as the selected processing state. In one embodiment, block 806 includes the method of block 612 wherein the selection of both the processing state and the current drain pattern is further based on at least one of: an amount of shared memory available on the computer system; one or more coupling requirements of the task; and one or more design constraints of the computer system.

Block 806 may use both load balancer module 302 and current drain pattern selector 304 or load balancer 402 and current drain pattern selector 404 to select both the processing state and current drain parameter concurrently. After both a processing state and a current drain parameter are selected, the method concludes with block 508.

Figure 9:
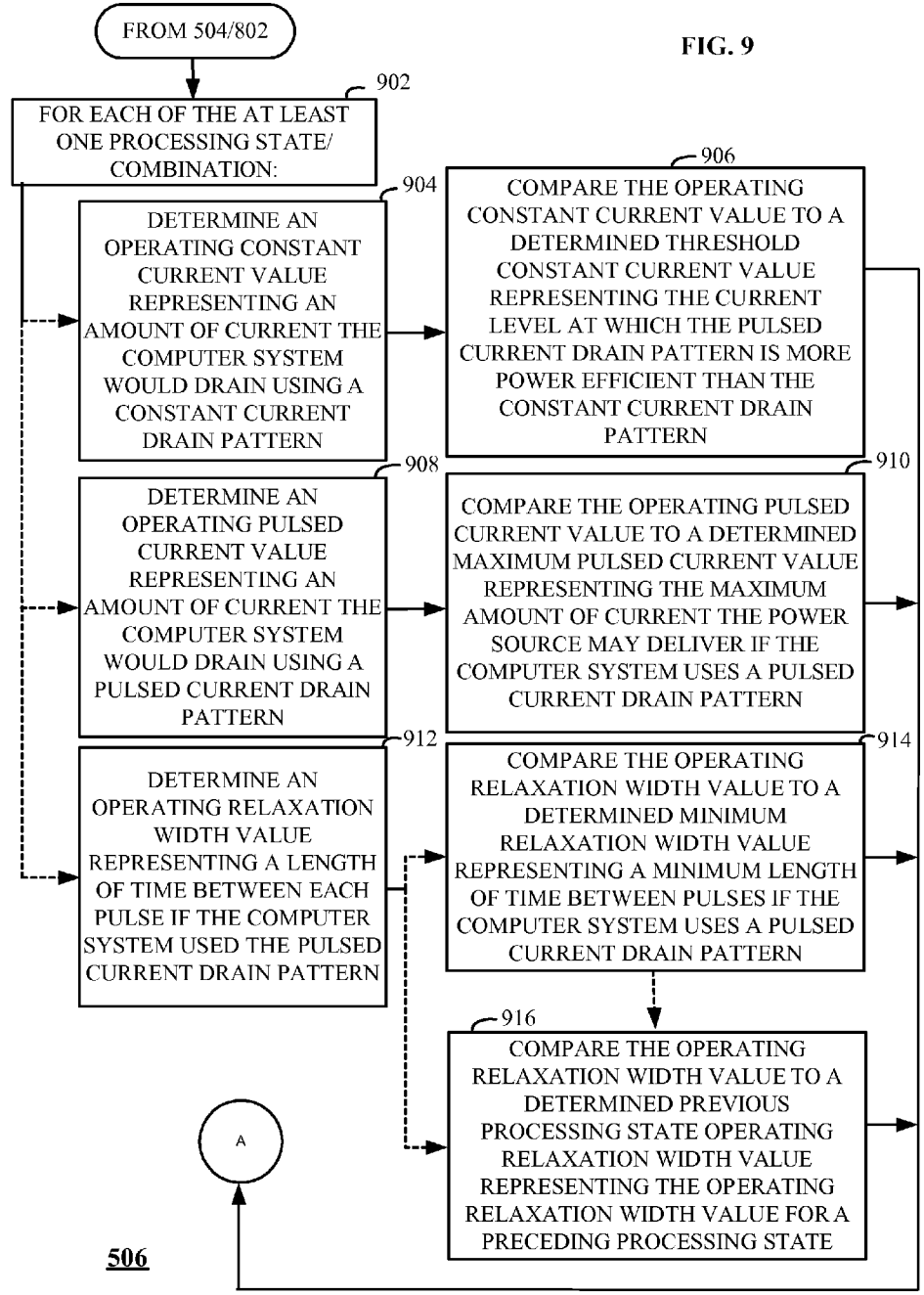
FIGS. 9-10 are flow charts illustrating one example of a method for selecting a current drain pattern to draw current from a power source in accordance with one embodiment of FIG. 5.
Figure 10:
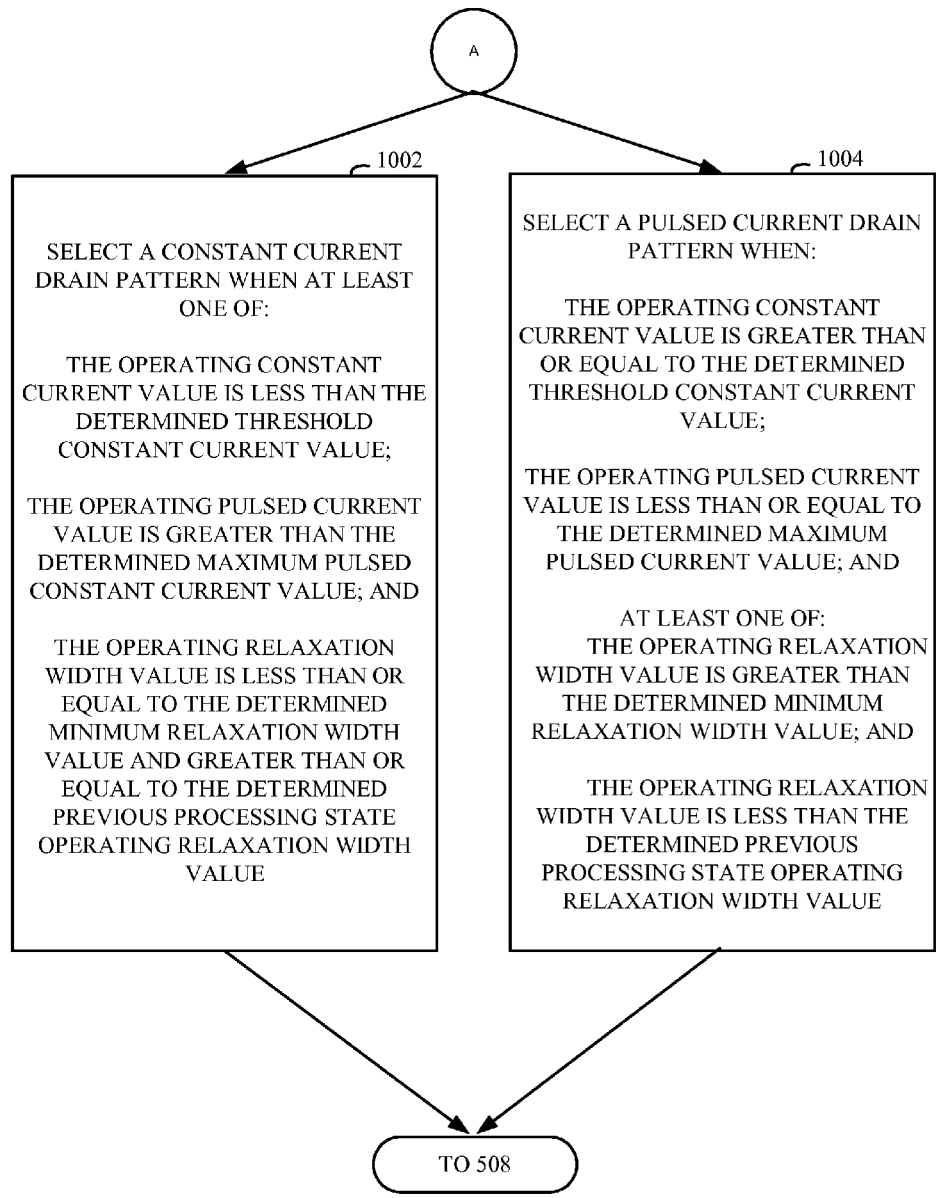

FIGS. 9-10 are flow charts illustrating one example of a method for selecting a current drain pattern to draw current from a power source in accordance with one embodiment of FIG. 5. The methods described below may be implemented using the current pattern drain selector module 304 or the current drain pattern selector 404. The method begins after block 504 or block 802 and, as illustrated in block 902, applies to each of the at least one processing block/combination. The method continues where at least one of block 904, 908 and 912 are selected. When block 904 is selected, block 906 logically follows. When block 908 is selected, block 910 logically follows. When block 912 is selected, at least one of block 914 and 916 logically follow.

In block 904, the method includes determining an operating constant current value representing an amount of current the computer system would drain using a constant drain pattern. The operating constant current value related to the amount of current that would be drained with respect to the execution of the requested task may be determined using a look up table where known values are predetermined using any suitable method (e.g., during development of the computer system 300, 400) or may be determined in real time. For example, if a task corresponds to an MPEG stream that does not have a clearly known end, one or more portions of the task may be identified and used to determine the operating constant current value for the one or more portions. As used herein, a task may correspond to any sized request at, for example, a stream level, a frame level, or macroblock level, etc. In block 906, the operating constant current value is compared to a determined threshold constant current value representing the current level at which the pulsed current drain pattern is more power efficient than the constant current drain pattern. The determined threshold constant current value further may indicate, for example, that below this value, the computer system should operate using a constant current drain pattern. In one embodiment, the threshold constant current value is predetermined (e.g., during development of the computer system 300, 400 and battery 112) or may alternatively be determined in real time (e.g., using a smart battery) and thus reflect the current state of the power source (e.g., battery). Each of the operating constant current value and the threshold constant current value are examples of the at least one constant current drain parameter (or of the at least one combination constant current drain parameter) as discussed above.

In block 908, an operating pulsed current value representing an amount of current the computer system would drain using a pulsed current drain pattern is determined. The operating pulsed current value relates to the amount of current that would be drained with respect to the execution of the requested task and may be determined using a look up table where known values are predetermined using any suitable method (e.g., during development of the computer system 300, 400) or may be determined in real time as similarly discussed above with reference to block 904. In block 910, the operating pulsed current value is compared to a determined maximum pulsed current value representing the maximum amount of current the power source may deliver if the computer system uses a pulsed current drain pattern. The determined maximum pulsed current value may be predetermined (e.g., during the development phase of the computer system 300, 400 and battery 112) or may alternatively be determined in real time (e.g., using a smart battery) and thus reflect the current state of the power source (e.g., battery). For instance, as the battery is drained, it might not be able to handle the pulses of current drain at the same drainage that it could at an earlier time.

In block 912, an operating relaxation width value is determined wherein the operating relaxation width value represents a length of time between each pulse if the computer system used the current pulsed pattern. The operating relaxation width value relates to the relaxation width with respect to the execution of the task requested and may be determined using a look up table where known values are predetermined using any suitable method (e.g., during development of the computer system 300, 400) or may be determined in real time using, for example, an idle counter or other suitable counter during execution to measure the idle time associated with the task or set of tasks. In block 914, the operating relaxation width value is compared to a determined minimum relaxation width value representing a minimum length of time between pulses if the computer system uses the pulsed current drain pattern. The determined minimum relaxation width value, like the operating relaxation width value may be predetermined (e.g., during the development phase of the computer system) or may alternatively be determined in real time (e.g., using a smart battery). The minimum relaxation width value may indicate, for example, that if the computer system is unable to relax for at least this amount of time between pulses, then the constant current drain parameter should be used. In block 916, the operating relaxation width value is compared to a determined previous processing state operating relaxation width value representing the operating relaxation width value for a preceding processing state. The previous processing operating relaxation width may be computed according to block 912 for a previous processing state and may be stored in any suitable memory.

Each of the operating pulsed current value, the maximum pulsed current value, the operating relaxation width value, the determined minimum relaxation width value and the previous processing state operating relaxation width value are examples of the at least one pulsed current drain parameter (or the at least one combination pulsed current drain parameter) as discussed above. The inventors have recognized that other pulsed current drain parameters may also be used. For example, the method may use, among other patterns: (1) an operating pulsed current width representing the length of time between each relaxation period when operating in a pulsed current drain mode; and (2) the operating pulsed background current value representing the background current that would be drained during the relaxation period, if any, when operating in a pulsed current drain mode.

The inventors have recognized that there may be more than one constant current drain pattern and pulsed current drain pattern appropriate for a given computer system 300, 400, battery 112, etc. The appropriate drains patterns may be predetermined during the development of the computer system 300, 400 and battery 112 or may be determined in real time using any suitable device and algorithm.

The method of FIG. 9 continues in FIG. 10 as indicated by reference numeral A. As illustrated in FIG. 10, after at least one of blocks 906, 910, 914 and 916, the method continues with at least one of blocks 1002-1004. In block 1002, a constant current drain pattern is selected when at least one of:
  the operating constant current value is less than the determined threshold constant current value;
  the operating pulsed current value is greater than the determined maximum pulsed constant current value; and
  the operating relaxation width value is less than or equal to the determined minimum relaxation width value and greater than or equal to the determined previous processing state operating relaxation width value.
In block 1004, a pulsed current drain pattern is selected when:
  the operating constant current value is greater than or equal to the determined threshold constant current value;
  the operating pulsed current value is less than or equal to the determined maximum pulsed current value; and
  at least one of:
  the operating relaxation width value is greater than the determined minimum relaxation width value; and
  the operating relaxation width value is less than the determined previous processing state operating relaxation width value.
Thereafter the method concludes with block 508.

The factors used to select one of the constant current drain pattern and the pulsed current drain pattern as provided in blocks 1002 and 1004 utilizes one set of assumptions for maximizing the time between charges of a battery. The inventors have recognized that other assumptions may be made based on other battery and computer system characteristics.

Thus, a method and apparatus has been disclosed that addresses the above needs of the prior art. Specifically, a method and apparatus has been described that optimizes power conservation in a computer system by optimizing load sharing among processing elements and by selecting an optimal current drain pattern to draw current from a suitable power source. Although the written description has been primarily described in the context of a handheld device using a battery as a power source, it is recognized that the disclosed method and apparatus may be incorporated in any suitable computer system to otherwise conserve power. It is recognized that conserving power in non-battery operated systems may allow the computer system to operate at a lower temperature. Similarly, although the written description has described the processing elements as being constituent members of the multimedia accelerator 102, it is noted that the above method and apparatus may equally apply to multiprocessor architectures where, for example, two or more central processing units are responsible for executing any number of tasks.

Among other advantages, the above method and apparatus lengthens the amount of time between charges of a battery powered computer system. Other advantages will be recognized by one of ordinary skill in the art. It will also be recognized that the above description describes mere examples and that other embodiments are envisioned and covered by the appended claims. It is therefore contemplated that the present invention cover any and all modifications, variations or equivalents that fall within the spirit and scope of the basic underlying principles disclosed above and claimed herein. For example, it is recognized that the identification and selection of a processing state to execute the task may each be influenced by different or other shared system resources as known in the art.

What is claimed is:

1. A computer system comprising:
    a load balancer that is operative to identify a plurality of processing states each operable to execute a task, wherein each processing state indicates how the task is to be distributed among a plurality of processing elements; and
    a current selector operative to select a processing state and select a battery characteristic, from a plurality of differing battery characteristics, that is most power efficient for execution of the task and executing the task using the selected processing state and selected battery characteristic.

2. The computer system of claim 1 wherein the load balancer selects the plurality of processing elements based on power consumption characteristics of the plurality of processing elements.

3. The computer system of claim 1 wherein the load balancer selects the plurality of processing elements based on functional capabilities of the plurality of processing elements.

4. The computer system of claim 1 wherein the plurality of battery characteristics comprise at least one of: a constant current drain parameter and a pulsed current drain parameter.

5. The computer system of claim 1 wherein the task comprises information that when executed by the plurality of processing elements causes the plurality of processing elements to at least one of: encode, decode, compress, and decompress media information.

6. The apparatus of claim 5 wherein the media information comprises at least one of: audio information and video information.

7. A method for reducing net power consumption in a computer system, the method comprising:
    identifying a plurality of processing states each operable to execute a task, wherein each processing state indicates how the task is to be distributed among a plurality of processing elements; and
    selecting a processing state and selecting a battery characteristic, from a plurality of differing battery characteristics, that is most power efficient for execution of the task and executing the task using the selected processing state and selected battery characteristic.

8. The method of claim 7 comprising selecting the plurality of processing elements based on power consumption characteristics of the plurality of processing elements.

9. The method of claim 7 comprising selecting the plurality of processing elements based on functional capabilities of the plurality of processing elements.

10. The method of claim 7, wherein the at least one of the plurality of battery characteristics comprise at least one of: a constant current drain parameter and a pulsed current drain parameter.

11. The method of claim 7 comprising, in response to the task, at least one of: encoding, decoding, compressing, and decompressing media information.

12. The method of claim 11 wherein the media information comprises at least one of: audio information and video information.

13. A non-transitory tangible computer readable medium comprising instructions that when executed by at least one processor cause the at least one processor to:
    identify a plurality of processing states each operable to execute a task, wherein each processing state indicates how the task is to be distributed among a plurality of processing elements; and
    select a processing state and select a battery characteristic, from a plurality of differing battery characteristics, that is most power efficient for execution of the task and executing the task using the selected processing state and selected battery characteristic.

14. The non-transitory computer readable medium of claim 13 wherein the instructions cause the at least one processor to at least one of:
    select the plurality of processing elements based on power consumption characteristics of the at least one of the plurality of processing elements; and
    select the plurality of processing elements based on functional capabilities of selects the at least one of the plurality of processing elements.

15. The non-transitory computer readable medium of claim 13 wherein the task comprises
    information that when executed by the at least one of the plurality of processing elements causes the plurality of processing elements to at least one of: encode, decode, compress, and decompress media information.

* * * * *